G. E. WISENER.
APPARATUS FOR RECOVERING METAL SCRAP.
APPLICATION FILED JUNE 25, 1914.
1,152,867.
Patented Sept. 7, 1915.
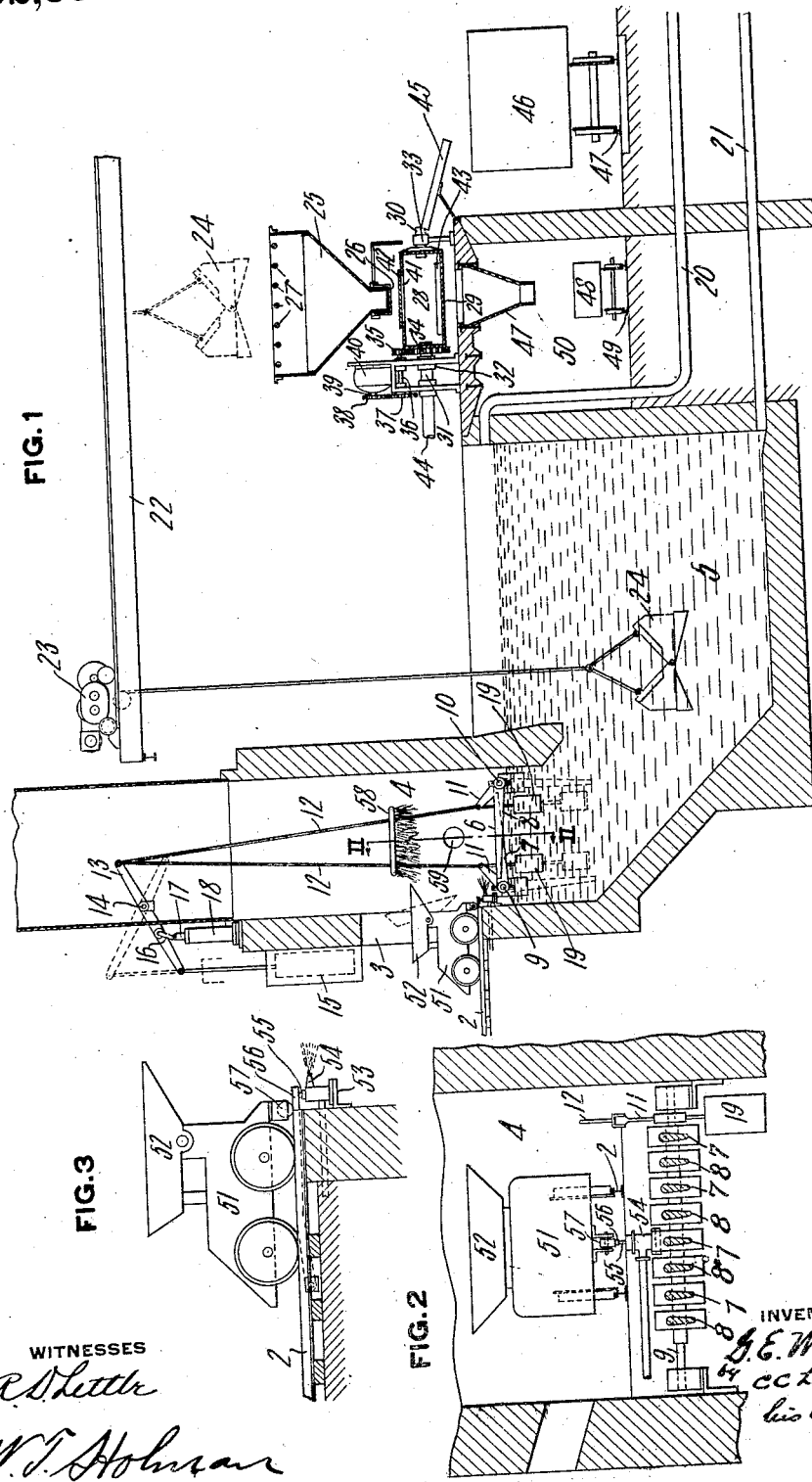

UNITED STATES PATENT OFFICE.

GEORGE E. WISENER, OF STEUBENVILLE, OHIO.

APPARATUS FOR RECOVERING METAL SCRAP.

1,152,867.    Specification of Letters Patent.    Patented Sept. 7, 1915.

Application filed June 25, 1914. Serial No. 847,260.

*To all whom it may concern:*

Be it known that I, GEORGE E. WISENER, a citizen of the United States, residing at Steubenville, in the county of Jefferson and State of Ohio, have invented certain new and useful Improvements in Apparatus for Recovering Metal Scrap, of which the following is a specification.

My invention relates to the recovery of metal scrap from cinder and slag and, while not restricted to such uses, more particularly relates to the recovery of the metal scrap contained in Bessemer and open hearth furnace slag. In such cinder or slag the metal scrap is incorporated in the cinder or slag largely in the form of shot, but with some pieces of larger size. The scrap metal being embedded in the slag, its extraction is generally so difficult and is accomplished at such high cost as to be prohibitive, or else the percentage of scrap metal recovered is such a small proportion of the total amount in the slag as to result in an added cost in making steel, due to the large amount of metal left in the slag and therefore lost. Heretofore such materials are hauled to a skull cracker, and the mass of cinder or slag is broken up by means of the skull cracker ball. The broken slag is then hand picked, to collect and recover such of the metal scrap as is separated from the slag in the crushing or breaking operations.

One object of my invention is to provide improved apparatus of separating and recovering the metal from such slag or cinder whereby the amount of metal reclaimed is materially greater than is possible with the apparatus heretofore in use.

Another object of the invention is to provide an improved apparatus for recovering the scrap whereby the metal is separated from the slag and is collected in a rapid, cheap and therefore economical manner.

Still further objects of my invention will appear hereinafter as the invention becomes more fully disclosed in the specification and is particularly pointed out in the appended claims.

Referring now to the drawings forming part of this specification, Figure 1 is a sectional elevation showing one form of apparatus for recovering metal scrap from slag and cinder, constructed and arranged in accordance with my invention. Fig. 2 is a transverse sectional elevation, the section being taken on the line II—II of Fig. 1, showing a detail in the construction of the apparatus of Fig. 1. Fig. 3 is a sectional side elevation, on a larger scale, showing a detail in the construction and arrangement of the dumping car and car track forming part of the apparatus of Fig. 1.

In the accompanying drawings, the numeral 2 designates a railway track, leading from a Bessemer converting mill, open hearth plant, cupola house, or other place of slag supply, to the inlet 3 for the vertical shaft 4 of the granulating pit 5 forming part of my improved apparatus.

The track 2 terminates within an opening 3 extending through one wall of the shaft 4, which is located at one side of and opens at its lower end into the granulating pit 5. The shaft 4 receives and holds the slag while being cooled from the highly heated state in which it is received to a condition in which it can be safely discharged into the pool of water maintained in the granulating pit 5 and also serves to carry off the steam formed in spraying the hot slag with water, as is done when the slag is positioned on the grating 6. Immediately below the level of the rails of the track 2 is the movable grating 6, which receives the slag or cinder dumped from the cars and which as shown, is formed of two series or sets of swinging bars 7 and 8. The bars are pivotally secured by one end to the rocking shafts 9 and 10 which extend lengthwise parallel at opposite sides of the shaft 4. The rocking shafts are mounted in bearings fixed to the side walls of the shaft and a rocker arm 11 is provided on one end of each of the rock shafts 9 and 10. The outer swinging ends of the rocker arms 11 are connected by a jointed rod, rope or similar flexible connection 12 to one end of a pivoted lever 13, which is pivotally mounted at an intermediate point in its length on a pivot pin 14 at a higher elevation in the shaft 4.

One end of the pivoted lever 13 is provided with a counterweight 15 and also connected to the counterweight end of this lever, by a link or pair of links 16 is the upper end of the piston rod 17 for the piston of the vertically extending fluid pressure cylinder 18, this cylinder being employed in swinging the lever 13 to move the sets of bars 7 and 8 forming the movable grating.

The rocker arms 11 on the end of the 8 from the position shown in full lines into that shown by dotted lines in Fig. 1 in dumping the slag and scrap supported thereon into the granulating pit 5. The granulating pit 5 is filled with water, an overflow pipe 20 leading therefrom maintaining the water at the desired level. A drain pipe 21 is also provided at the bottom of the pit to empty the water therefrom at such intervals as are found necessary or desirable.

Located above the open upper end of the granulating pit 5 is a crane runway on which the girders of a traveling crane 22 are mounted. This crane has a trolley 23 thereon from which a grab bucket 24 of the clam shell type is suspended. The grab bucket however may be of the orange peel or other desired type.

Located at one side of the granulating pit 5, at a convenient distance therefrom, so as to be within the range of the overhead traveling crane 22 is a hopper 25 having a gate or door 26 on its lower end for regulating and controlling the discharge of materials from the hopper. The open upper end of this hopper is provided with a series of horizontally extending bars 27 forming a grid or grating at the upper edge of the hopper. Positioned beneath the opening in the bottom of the hopper 25 is a rotary crushing mill 28, which as shown comprises a cylindrical shell 29 having hollow trunnions, 30 31, one on each end, which are mounted in bearings 32, 33, so as to permit rotation of the cylindrical crushing mill. A spur gear 34 on the trunnion 31 is in mesh with a spur pinion 35 on the countershaft 36 and the spur gear 37 on the other end of this countershaft is in mesh with the gear 38 on the armature shaft 39 of the driving motor 40.

The shell 29 of the crushing mill is provided with an opening 41 which is normally closed by the door or cover 42 when the mill is in operation. Positioned within the shell of the crushing mill is a bar of steel 43 which may conveniently be formed of a rolled steel billet, this bar of steel being of a length greater than the diameter of the mill and rolling around on the interior of the mill so as to crush the slag or cinder placed therein. A water pipe 44 which extends into the hollow trunnion 31 on one end of the crushing mill 28 discharges into the crushing mill and an overflow trough 45 at the outer end of the opening in the other trunnion 30 of the crushing mill, is arranged to discharge into the body of a railway car 46 positioned on the depressed track 47 at one side of the rotary crushing mill.

Immediately below the crushing mill 28 lower end of the hopper 41, on the car track 49 in the tunnel 50 beneath the crushing mill and hopper.

A dumping car 51 of any desired type may be employed to transport the slag to the shaft 4 and discharge the slag upon the grating formed by the bars 7 and 8 in this shaft, the car being loaded in any desired manner. In the particular construction shown, the bed 52 of the car is mounted on pivot bearings and tilts to discharge its load.

Secured on a bracket 53 in the shaft 4 leading to the granulating pit 5 is a high pressure water outlet 54 which is provided with a valve 55 to control the flow of water under pressure therethrough. The valve is operatively connected to one end of a pivoted valve operating bar 56 and this bar is positioned to be engaged and depressed by the anti-friction roller 57 on the front end of the car 51 by which the slag or cinder is delivered to the shaft 4 of the pit. Also positioned within the shaft of the cinder pit above the entrance to the shaft is a spray pipe 58 by which water is sprayed upon the highly heated slag, while the slag is resting on the bars 7 and 8 of the grating in the shaft.

In some cases it may prove desirable or necessary to cause the slag or cinder to discharge upon the grating bars 7 and 8 in a molten or plastic state and in such case the end of the cinder trough used projects through the hole 59 in the side wall of the shaft 4. Ordinarily, however, the highly heated slag will be in a substantially solid state when deposited upon the grating bars.

In recovering scrap with the apparatus forming part of my invention, the slag, generally while still highly heated, is delivered on the car 51 from the point of supply to the discharge opening 3 in the shaft. The car 51 is then dumped to discharge the slag upon the movable bars 7 and 8 of the grating in the shaft 4 of the granulating pit.

The grating is positioned above the level at which the pool of water is maintained in the pit, and the hot slag while supported thereon is sprayed with water from the spray pipe 58 to cool it to a point where, when dumped into the pool of water in the slag pit, the danger of an explosion is past. After a quantity of slag is discharged upon the swinging grate bars 7 and 8 it is sprayed with water until sufficiently cool to render it safe to dump the mass of cinder into the granulating pit. When this point in the cooling operation is reached the piston 17 in the operating cylinder 18 is caused to lift, which causes the movable bars 7 and 8 forming the grating to swing downwardly from the position shown in full lines into that shown by dotted lines in Fig. 1.

The falling mass of slag is discharged by the sloping side wall at the bottom of the shaft 4 into the granulating pit 5, where the water acts to cool and granulate the still highly heated slag. The grab bucket 24 on the trolley 23 of the traveling crane 22 is then employed to lift the granulated slag from the pit and deposit it in the hopper 27 located above the rotary crushing mill 28. The bars 27 forming the grating on the open upper end of this hopper will catch any large pieces of slag or of scrap while permitting the smaller pieces to drop into the hopper. After the hopper 27 collects a sufficient quantity of slag to fill the crushing mill 28 to its working capacity, generally slightly less than half full, the door 41 on the crushing mill is opened, the mill being turned by means of the motor 40 until the door opening 41 is at the top of the mill. The gate 26 on the hopper 25 is then opened and the granulated slag therein is discharged from the hopper into the mill 28. The door 42 is then fastened in closed position, and the crushing mill 28 is started to rotate. A stream of water which enters through the hollow trunnion 31, and passes outwardly through the other hollow trunnion 30, is kept flowing through the mill. The metal bar 43 within the crushing mill 28, by rotation of the cylinder, is caused to roll therein and fall upon the cinder or slag within the mill and crush it into small pieces. The stream of water flowing through the crushing mill carries off the light particles of crushed cinder, the cinder or slag passing outwardly through the opening in the hollow trunnion 30 into the chute 45 and being delivered into the car 46 on the depressed track 47.

After a quantity of slag in the cylinder of the crushing mill has been crushed and has been caused to pass out of the mill by the action of the flowing stream of water, the mill is stopped with the door opening 41 therein at the bottom of the mill and the door 42 is then released and opened. When the door 42 opens the scrap metal recovered from the quantity of slag placed in the mill, is discharged into the hopper 47 suspended beneath the mill and is discharged thereby into the small car 48 on the track 49 within the tunnel 50. When the car 46 is filled with cinder it is replaced with another and when the car 48 on the track in the tunnel 50 becomes filled with recovered scrap, the scrap is taken to the converter or other place of use or is stored for use later. The above described operations are then repeated with successive quantities of slag, the slag being delivered upon the grating, then partly cooled when necessary and then being discharged into the granulating pit, as fast as received from the converting mill. The granulated slag is removed from the granulating pit as fast as is required to keep the slag crushing mill in continuous operation and the scrap is recovered from the slag as the slag is formed.

The advantages of my invention will be appreciated by those skilled in the art.

By the use of my improved apparatus the percentage of metal recovered is largely increased, and a large proportion of the metal heretofore necessarily lost as scrap in the operation of open hearth and Bessemer plants is avoided. The cost of separating the scrap from the slag is greatly lessened, the necessity of first cooling and breaking the slag with a skull cracker and then picking the slag therefrom by hand is avoided and the danger and liability of accident to operators by pieces flying from under the drop ball of the skull cracker is overcome. The accumulation of hot cinder is prevented and the recovery of the scrap is carried out with the same regularity as the operation of the other parts of the steel making plant.

Modifications in the construction and arrangement of the parts of the apparatus forming my invention may be made without departing from my invention.

The size of the granulating pit may be varied, a plurality of cinder mills may be employed when found necessary or desirable. The construction of the cars may be changed and other variations of the construction and arrangement of the parts may be made.

The preliminary cooling step may be omitted and the slag allowed to cool by influence of the atmosphere when desired, and other modifications may be made within the scope of the invention as defined in the appended claims.

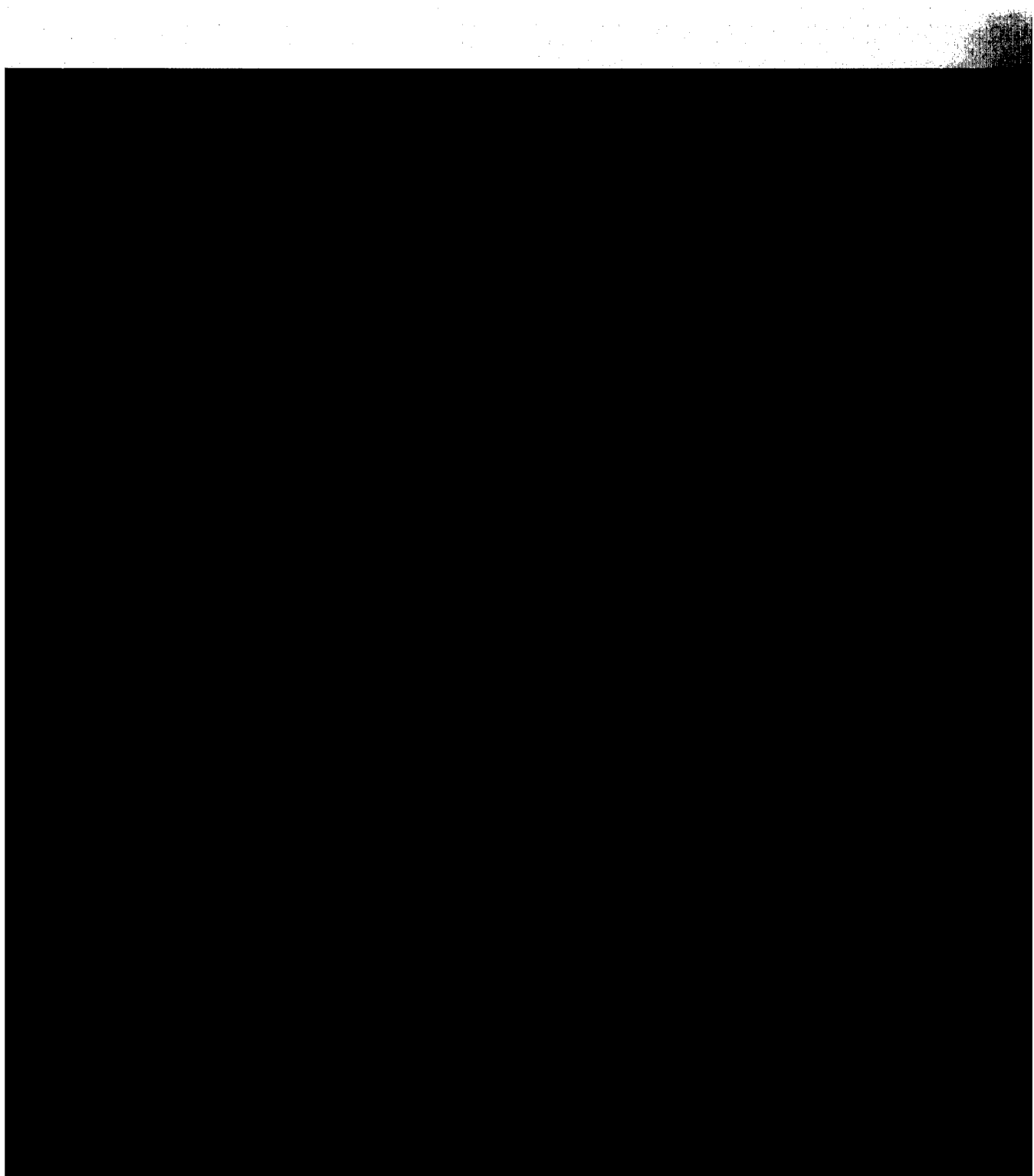

I claim:—

1. Apparatus for recovering metal scrap from slag, comprising in combination, a slag cooling grating, means for depositing heated slag on said grating, means for spraying water on the heated slag supported on the grating, and a granulating pit into which said grating discharges the slag supported thereon.

2. Apparatus for recovering metal scrap from slag, comprising in combination, a tilting slag cooling grating, means for depositing heated slag on said grating, means for spraying water on the heated slag supported on the grating, means for tilting said grating, and a granulating pit into which said grating discharges the slag supported thereon.

3. Apparatus for recovering metal scrap from slag, comprising in combination, a slag cooling grating, means for spraying water on heated slag supported on the grating, a granulating pit into which said grat-